United States Patent [19]

Peavey et al.

[11] Patent Number: 5,533,103

[45] Date of Patent: Jul. 2, 1996

[54] CALLING SYSTEM AND METHOD

[75] Inventors: Stephen D. Peavey, Meriden; James E. Ogden, New Fairfield; William J. Hoyt, Middletown; Ino Dunn, Norwalk; Paul E. Zmuda, Stratford; David A. Jamroga, Stamford, all of Conn.; Jacob W. Jorgensen, Teaneck, N.J.

[73] Assignee: Electronic Information Systems, Inc., Stamford, Conn.

[21] Appl. No.: 473,941

[22] Filed: Jun. 7, 1995

Related U.S. Application Data

[63] Continuation of Ser. No. 234,484, Apr. 28, 1994, abandoned.

[51] Int. Cl.⁶ .................................................. H04M 11/10
[52] U.S. Cl. ........................... 379/69; 379/67; 379/85; 379/88; 379/265
[58] Field of Search ............................ 379/67, 69, 71, 379/75, 84, 85, 86, 87, 88, 89, 92, 93, 112, 218, 265, 266, 308, 309

[56] References Cited

U.S. PATENT DOCUMENTS

| | | | |
|---|---|---|---|
| Re. 34,536 | 2/1994 | Frimmel, Jr. | 379/8 |
| 3,045,068 | 7/1962 | Weingart et al. | 379/85 |
| 3,394,229 | 12/1963 | Miller et al. | |
| 3,989,899 | 11/1976 | Norwich | 379/134 |
| 4,599,493 | 7/1986 | Cave | 379/247 |
| 4,600,814 | 7/1986 | Cunniff et al. | 379/94 |
| 4,797,911 | 1/1989 | Szlam et al. | 379/67 |
| 4,805,209 | 2/1989 | Baker, Jr. et al. | 379/96 |
| 4,829,514 | 5/1989 | Frimmel, Jr. et al. | 379/89 |
| 4,841,574 | 6/1989 | Pham et al. | 379/87 X |
| 4,866,756 | 9/1989 | Crane et al. | 379/88 |
| 4,894,857 | 1/1990 | Szlam et al. | 379/67 |
| 4,914,586 | 4/1990 | Swinehart et al. | 364/200 |
| 5,003,574 | 3/1991 | Deng et al. | 379/84 |
| 5,033,088 | 7/1991 | Shipman | 379/88 X |
| 5,040,208 | 8/1991 | Jolissaint | 379/209 |
| 5,241,586 | 8/1993 | Wilson et al. | 379/88 |
| 5,297,195 | 3/1994 | Thorm et al. | 379/93 |
| 5,303,296 | 4/1994 | Zucker | 379/84 |
| 5,309,505 | 5/1994 | Szlam et al. | 379/77 |
| 5,325,290 | 6/1994 | Cauffman et al. | 379/112 |

FOREIGN PATENT DOCUMENTS

| | | | |
|---|---|---|---|
| 62-008651 | 1/1987 | Japan | 379/87 |
| 63-067954 | 3/1988 | Japan | 379/85 |
| 1-101770 | 4/1989 | Japan | 379/85 |
| 4-035562 | 2/1992 | Japan | 379/85 |
| 2257872 | 1/1993 | United Kingdom | 379/84 |

OTHER PUBLICATIONS

"Why Voice Recording Technology is Essential to Quality", Johnson, Telemarketing Magazine, Mar. 1994, vol. 12, No. 9, pp. 29–31.

*Primary Examiner*—Jeffery Hofsass
*Assistant Examiner*—Scott L. Weaver
*Attorney, Agent, or Firm*—Lane, Aitken & McCann

[57] ABSTRACT

An automated computer calling system is disclosed for correlating diverse types of recorded information, such as voice or video, with data records that have been previously stored and/or simultaneously entered. The calling system is capable of simultaneously recording and processing multiple customer transactions, and verifying the transactions on the basis of the recorded information. In a preferred embodiment, the calling system includes: a customer database; one or more agent stations connected to a communications network; a call processor for controlling the communication between the agent stations and the customers and for selectively recording at least a portion of the conversation between a customer and an agent; a call manager for monitoring the customer communications and enabling data exchange between the customer database and the agent station, and for supplying the call processor with information required to initiate and terminate the communication; and a call recorder for linking the recorded voice information with the corresponding customer data record.

1 Claim, 13 Drawing Sheets

CALL RECORDER

CALLING SYSTEM AND METHOD

This application is a continuation of application Ser. No. 08/234,484, filed Apr. 28, 1994, abandoned.

FIELD OF THE INVENTION

The present invention relates to a system for receiving and storing unformatted information such as voice or video transmitted over a communications network media, and linking this received information with previously stored data records. The preferred embodiment of the invention relates to a calling or telemarketing system capable of linking the recorded on-line voice information with simultaneously entered and/or previously stored text records. The system of the preferred embodiment also provides for verifying the text records on the basis of the recorded voice information.

BACKGROUND OF THE INVENTION

Prior art computer calling systems have been designed to automatically dial customer telephone numbers and determine when a person (also referred to as a "customer" or "called party") answers the call. An agent at the calling system is then connected to the customer who answered the call. The agent typically reads from a prepared script and enters the information communicated during the conversation by the customer in a computer terminal.

Such calling systems are used in telemarketing, in public opinion polls, in debt collection or in other calling campaigns which require communication between an agent and a targeted group of people. In the context of this disclosure, a person referred to as a "customer" is any person called for the purposes of a particular telephone campaign.

For practical and legal purposes it is often desirable to monitor and record at least a part of the conversation between the customer and the agent. Such recording helps to verify the accuracy of the entered data and correct mistakes; to detect, prevent and deter fraud and monitor agents' performance; and to defend against false claims.

In the prior art calling systems, the monitoring and recording of the communications with the customers are cumbersome, labor intensive and inefficient. One reason is that the call recording equipment is typically separated from the computer system which stores and processes the customer data records that contain the information about each customer, such as the telephone number, ordering information and the like. During a call, this separation places additional burden on the agent who has to operate simultaneously different types of equipment. In addition, after the conversation has been completed the individual voice and data records have to be sorted and accurately labeled in order to establish the proper correlation between the records. Finally, it is time consuming to verify a given customer transaction entered by the agent because the corresponding voice record is stored separately from the data record and, therefore, the records should be independently located and physically correlated by the verifying person.

For example, for recording conversations with the customers, an agent is typically provided with an analog tape recorder connected to the telephone line. At an appropriate point in the conversation the agent must manually start the tape recorder. At the same time, the agent has to obtain the order information and enter it in the computer. The agent also has to manually stop the tape recorder after the desired voice recording is completed. At the end of a shift, one agent's tape may contain numerous recorded conversations.

As discussed, subsequent verification of the entered customer data record using the taped conversation is cumbersome. To verify a particular customer transaction one must find the appropriate agent's tape, which has been labeled and stored, and then locate the appropriate record of the conversation on the tape. Thus, a verifier may have to sift through numerous conversations on one tape to find the relevant one. Due to the fact that the prior art systems require substantial human intervention, low productivity, human errors and lost information are inevitable.

Thus, although the prior art calling systems provide substantial automation of many aspects of the calling campaigns, such systems still suffer from deficiencies due to customer record management problems.

SUMMARY OF THE INVENTION

The present invention provides an automated computer calling system that overcomes the drawbacks of the prior art. In addition, the present invention provides a method of correlating diverse types of recorded information, such as voice or video, with data records that have been previously stored and/or simultaneously entered. The calling system of the present invention is also capable of simultaneously recording and processing multiple customer transactions.

In the preferred embodiment, the calling system of this invention can be logically divided into two main subsystems: a data recording and managing subsystem and a data verification subsystem.

The data recording and managing subsystem of the preferred embodiment is connected to a communications network (in particular, a telecommunications network). This subsystem includes: (1) a customer database; (2) at least one agent station connected to the communications network; (3) a call processor for controlling the communication between the agent stations and the customers and for selectively recording at least a portion of the conversation between a customer and an agent; (4) a call manager for monitoring the customer communications and enabling data exchange between the customer database and the agent station, and for supplying the call processor with information required to initiate and terminate the communication; (5) a call recorder for linking the recorded voice information with the corresponding customer data record.

Each agent station of the preferred embodiment is provided with a data terminal linked to the call manager which includes or provides access to the customer data base. The stations also include a telephone or another two-way communication device to communicate with the customers.

The call processor is connected to standard telecommunication trunk lines and includes a controllable switch connection between the trunk lines and the telephones at the agent stations. In response to information provided by the call manager, the call processor can automatically dial the customer telephone numbers and switch each connected call to an available agent station. The call processor is further capable of recording and storing several simultaneous agent-customer conversations into one or more temporary storage buffers. It may also include electronic circuitry to digitize incoming data on the communications network lines.

As indicated, the call manager may include or has access to the customer database. The data base may also be located at a host computer. The call manager of the preferred embodiment communicates with the call processor, call recorder and the terminals at the agent stations. The call manager provides to the call processor the information necessary to initiate the communication with the customers, such as their telephone numbers. Once the communication between the agent and the customer is established, the call manager provides to the terminal at the agent's station on-line information about the customer to whom the station is connected, and a script from which the agent reads during the calling session. In response to a signal from the agent, the call manager can also initiate, suspend or terminate recording of the customer communication.

The call manager of the preferred embodiment also controls the operation of the call recorder. The call recorder reads the temporary storage buffers of the call processor, which stores simultaneous customer conversations in a continuous data stream as labeled segments of digitized voice signals. The call recorder records and collates one or more segments of the conversation into a single data structure identified with the corresponding customer. The call recorder next merges such voice data structures with the customer data record which contains displayable data, and stores them into a customer related "merge" file. This merge file can subsequently be used by the verification subsystem.

In a preferred embodiment of the present invention, the call processor, the call manager and the call recorder of the system are computer processes which may create and exchange messages and data. A separate computer can be provided for each of these processes or they can run on a single multiprocessing system. The data recording and managing subsystem may also include a removable mass storage for storing the records from the call recorder for use by the data verification subsystem.

The data verification subsystem of the preferred embodiment of the present invention comprises a file server, a supervisor station connected to the file server and verifier stations connected to the file server. The system may also include a removable mass storage, such as a tape drive for storing customer records from the recording and data managing subsystem. In an alternate embodiment of the present invention, the data verification subsystem may include a host computer instead of the supervisor station and the file server.

The two subsystems of the calling system of the present invention are interconnected and can transmit data to each other. The link between the recorder and the verification subsystem can be implemented using any suitable technique such as store and forward, batch transfer, network communication, or on-line transaction processing.

At the beginning of the calling process, the customer data records are transmitted to the call manager from the file server (or the host). The call manager uploads a list of telephone numbers of the customers to be called to the call processor. In the preferred embodiment of the present invention, the call manager also sends to the call processor identifying keys which serve to link the telephone numbers to the customer data records. Alternatively, the customer telephone numbers themselves may serve as such identifying keys. At the same time, the call manager opens a description file, which enables the customer data to be communicated, on-line, to the agent stations. The description file and the uploaded list of telephone numbers define a calling campaign for a particular telemarketing or other purpose.

Next, the call processor begins automatically dialing the numbers of the customers on the telecommunication trunk lines. When the call processor detects a voice answering the call on the lines, the corresponding trunk line is switched to a telephone at an available agent station. If the telecommunication line is analog, the call processor digitizes the incoming voice signals. If there is no response or a busy signal on the lines, the call processor may repeat the dialing process a number of times, or mark the number for a later dialing.

As the answered network line is being switched to an agent station, the call processor sends a message to the call manager which identifies the agent handling this call and the telephone number or identifying key of the connected customer call. In response, the call manager retrieves information about this customer from the description file, merges it with a prepared script used for the particular calling campaign, and downloads this information to the terminal of the agent handling the call. The call manager may initially only download certain basic customer information along with the prepared script and later provide the full available information.

During the conversation with the customer, the agent enters information at the terminal keyboard, and the call manager updates the customer data record accordingly. At some point in the conversation, the agent may signal the call manager (e.g., by a special terminal entry) to begin recording the conversation. In response, the call manager generates a message containing the identity of the agent station and an identifying key of the customer. This message instructs the call processor to begin recording of the conversation.

In the beginning of the recording, the call processor creates a start call control structure, which contains the customer identifying key and a conversation identification (ID), and stores this control structure into a temporary buffer. Next, the call processor divides the voice signal representing the customer-agent conversation into segments, each one labeled with the conversation ID. Conversation segments from different simultaneous customer conversations are mixed into a data stream, which is stored in the temporary buffer.

The call recorder retrieves the control structures and conversation segments from the call processor's buffer(s) over a high speed data link, such as a channel connection or local area network, and places them in a temporary storage.

The call recorder reads data from its temporary storage until it finds a start call control structure. It then creates a merge file comprising a header, a control record portion, free storage space for customer data, and free storage space for conversation data of variable length. As the call recorder continues to read data from its temporary storage, it collates conversation segments containing the same conversation ID and appends them to the end of the merge file.

The agent notifies the call manager about the end of the conversation to be recorded by entering a keystroke (or a keystroke sequence) at the station terminal. In response, the call manager sends a message which signals the end of the conversation to the call processor. This message includes the unique customer identifying key and the identity of the agent station. In response to this message, the call processor discontinues recording of the conversation and creates a stop call control structure which also contains the unique customer identifying key and the conversation ID, and stores this structure in its temporary buffer. The call processor transfers the recorded completed conversations to the call recorder, which combines the segments of each conversation into a corresponding separate data structure. The call manager waits for the agent to complete any remaining data entry and finish updating customer information in the customer data record.

At any one time, the system of this invention may handle numerous simultaneous conversations. To efficiently process all the calls, the call processor may interleave control structures and conversation segments from various sessions in a data stream which is stored in the call processor temporary buffer(s). The call recorder may have a number of simultaneously open merge files into each of which it stores associated control records and conversation segments. The conversation ID attached to the control structures and the conversation segments allows the call recorder to properly collate the data recorded from different calls.

After the call campaign is completed (that is, when the call processor finishes dialing its list of telephone numbers), the call manager closes the customer description file. At this point, the description file contains updated customer data records, each separated by a control record containing the unique Key associated with the particular customer.

As part of the post-processing stage which includes merging of the voice and data, the call recorder retrieves the description file from the call manager. It reads the customer identifying key from each merge file and looks for the same key in the description file. When it finds a match, the call recorder copies the associated control record and customer data information into the merge file. It then closes the merge file for the particular customer transaction and repeats the process for the next merge file. At the end of the post-processing stage each merge file contains a data management file header, a control record, customer information, and digitized voice data which relate to the same transaction.

To verify customer transactions, the merge files are transferred to the verification subsystem either directly or through an intermediate data store. The merge files selected to be reviewed by the supervisor are stored on the file server of the verification subsystem. Each verifier station can retrieve merge files from the file server and convert the previously stored digitized voice to proper analog format and present it to an operator. Simultaneously, the verifier stations display customer data records. If any mistakes are found, the errors are corrected in the data records.

DETAILED DESCRIPTION OF THE PREFERRED EMBODIMENT

Figure 1:
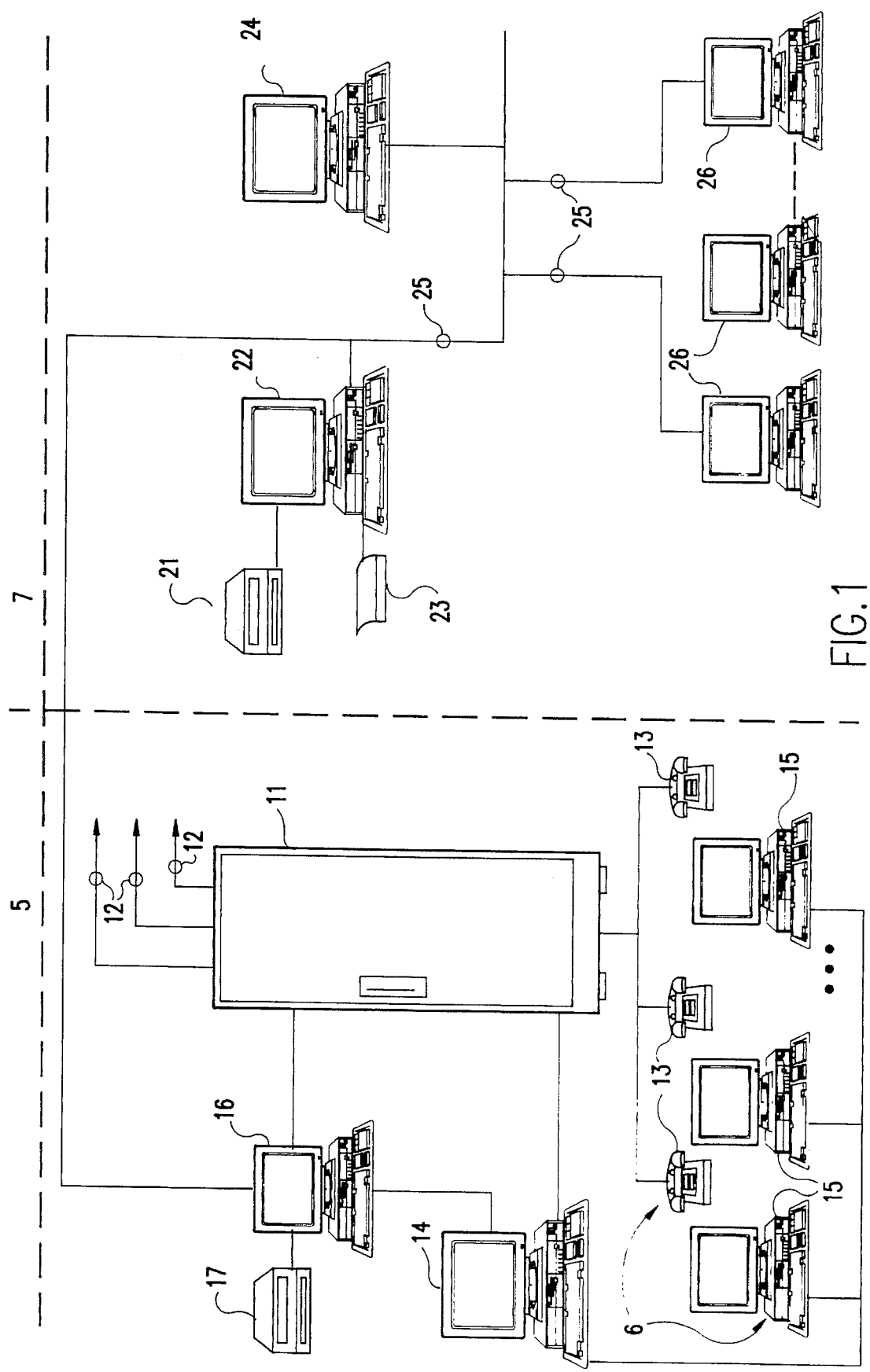
FIG. 1 is a block diagram of the preferred embodiment of the calling system of this invention.

FIG. 1 shows a hardware architecture of the preferred embodiment of the system of the present invention. It comprises two subsystems: a data recording and management subsystem 5, and a data verification subsystem 7.

Data recording and management subsystem 5 is designed to initiate and conduct calls to a targeted group of people and manage records of the conversations. A list of people (referred to as "customers," or "called parties") along with their telephone numbers is required to define a calling campaign, such as telemarketing, polling, debt collection or any other suitable calling application. To contact the customers, subsystem 5 employs a communications network 12, such as a standard telephone network and comprises: (1) a customer database, which in the preferred embodiment, is located at call manager 14 and stores customer data records; (2) at least one agent station 6 with a facility to communicate over the network; (3) call processor 11 for initiating and controlling the communication between agent stations 6 and the customers, and for selectively recording at least a portion of the communication between a customer and an agent; (4) call manager 14 for monitoring the communication process and enabling data exchange between the customer database and the agent stations, and for supplying to call processor 11 information required to initiate and terminate the communication; and (5) call recorder 16 for linking the recorded voice information with the corresponding customer data record.

More specifically, in the preferred embodiment each agent station of the system is provided with a data terminal 15 (dumb terminal, PC or another computer device) linked to call manager 14 and the customer database, and a telephone 13 or another two-way communication device to communicate via lines 12 with the customers. Thus, each agent at the station can talk to a customer and simultaneously enter order or other customer information while reading a prepared script from the terminal.

Call processor 11 is connected to standard telecommunication trunk lines 12 and includes a controllable switch connection between the trunk lines and the telephones 13 at the agent stations. In response to data transmitted from the call manager 14, call processor 11 can automatically dial the customer telephone numbers and switch each connected call to an available agent station. Call processor 11 is also capable of recording and storing several simultaneous agent-customer conversations into one or more temporary storage buffers. It may also include electronic circuitry to digitize incoming data on the communication network lines 12.

Call manager 14 can include and/or has access to the customer database (which may also be located at a host computer) and communicates with call processor 11, call recorder 16 and the terminals 15 at the agent stations. Call manager 14 provides to call processor 11 the information necessary to initiate the communication with the customers, such as their telephone numbers. Once the communication between the agent and the customer is established, call manager 14 provides to the terminals 15 at the agent stations on-line information about the customer to whom the station is connected, and a script from which the agent reads during the calling session. In response to a signal from the agent, call manager 14 can also initiate, suspend or terminate recording of the conversation between the customer and the agent. In addition, call manager 14 can schedule redial of numbers which resulted in no-connects, provide real time statistics on all dial attempts and generate reports on the results of the calling campaign.

Call manager 14 of the present invention also controls the operation of call recorder 16. Call recorder 16 reads the temporary storage buffers of call processor 11, where simultaneous customer conversations are stored in a continuous data stream as labeled voice data segments, and records and collates one or more segments of each conversation into a single data structure identified with the appropriate customer. Call recorder 16 next merges such voice data structures with the customer data records, which include displayable information, from the call manager and stores them into the customer related "merge" files. These merge files can subsequently be used by the verification subsystem 7.

In a preferred embodiment of the present invention, call processor 11, call manager 14 and call recorder 16 of the system are computer processes which are capable of creating and exchanging messages and data. A separate computer can be provided for each of these processes or they can run on a single multiprocessing system. The data recording and managing subsystem 5 may also include a removable mass storage 17 for storing customer records of the call recorder 16.

Data verification subsystem 7, in the preferred embodiment of the present invention comprises a file server 24, a supervisor station 22 connected to the file server 24 and verifier stations 26, which are connected to the file server. The verification subsystem 7 may also include a removable mass storage 21, such as a tape drive, for storing customer records received from the recording and data managing subsystem 5. It may also include a printer 23 to provide a hard copy record of the verification subsystem 7 output. In an alternate embodiment of the present invention, the data verification subsystem 7 may include a host computer instead of the supervisor station and the file server.

Figure 2A:
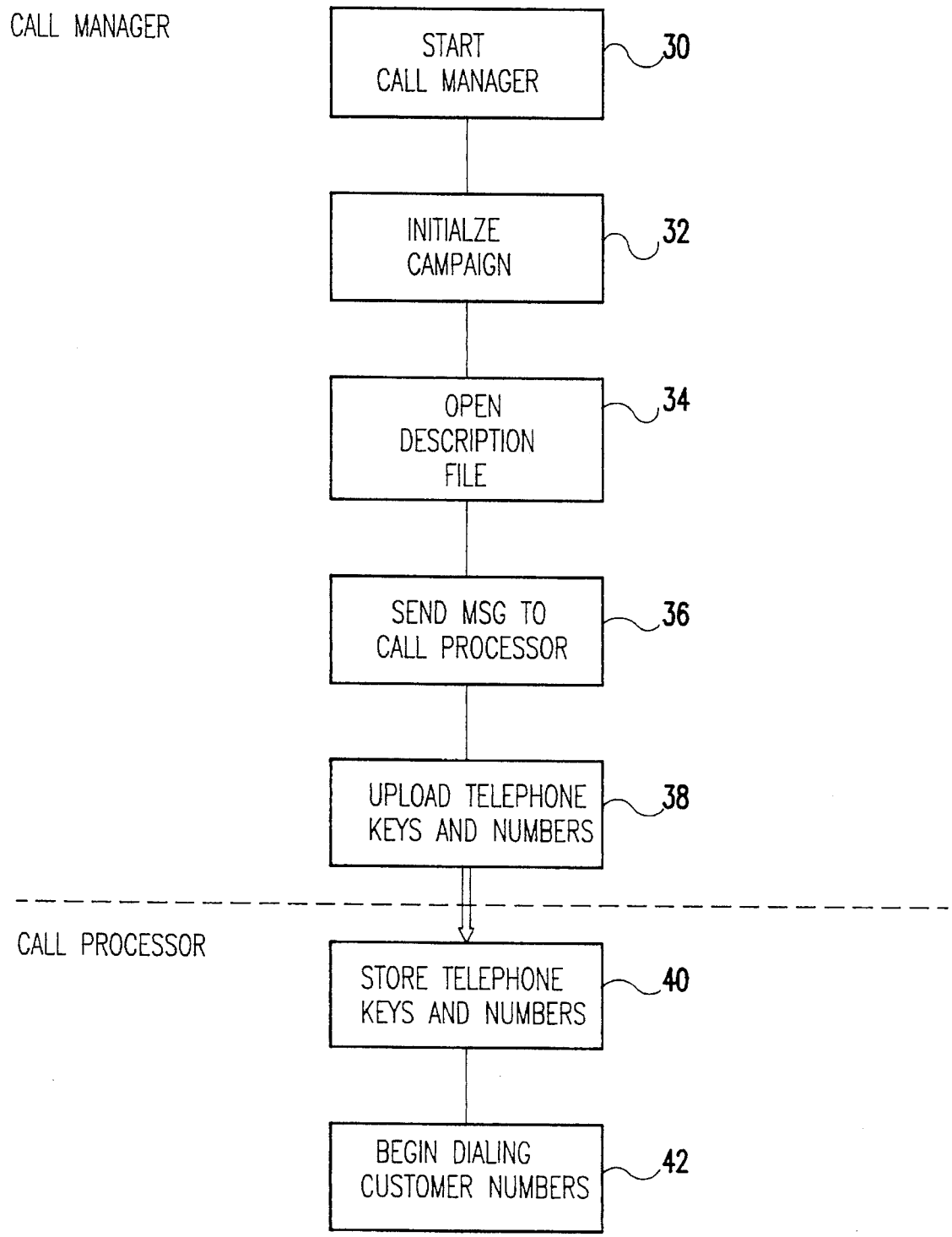
FIGS. 2A to 2F is a flowchart of the information flow of the data recording and management subsystem.

Referring to FIG. 2A, the operation of the calling system of the present invention is initiated by invoking the call manager process at step 30. Call manager 14 then initiates the calling campaign by opening the description file 175 shown in FIG. 5 (steps 32, 34). Description file 175 stores a list of the customers' telephone numbers and a unique customer identifying Key assigned to each customer record. In a different embodiment, the customer telephone number may serve as such a key. The description file 175 may also include customer data such as a record of previous purchase orders or other relevant customer information.

Call manager 14 next sends a message to call processor 11 and uploads the list of customer identifying Keys and corresponding telephone numbers to be called during a calling campaign to call processor 11 (steps 36, 38).

The message from call manager 14 to call processor 11 typically comprises the following elements: (1) "Message Type Code", which identifies what message is being sent (In this case, it indicates that the call manager is uploading telephone numbers to the call processor); (2) "Campaign ID", which identifies the calling session to be set up between the customers and the agents; (3) "Telephone Numbers"; and (4) "Customer Keys", which is an optional element that links the telephone numbers to on-line customer data. These customer Keys are also referred to as customer identifying Keys which were discussed above.

Call processor 11 next stores the telephone numbers and begins automatically dialing the numbers (steps 40, 42). Call processor 11 monitors the responses on the telephone network lines 12 to detect the answered calls. Call processor 11 may also redial busy numbers, mark for a later retry the numbers that were not answered, and perform other automatic dialing routines in response to control signals from call manager 14, as known in the art.

Figure 2B:
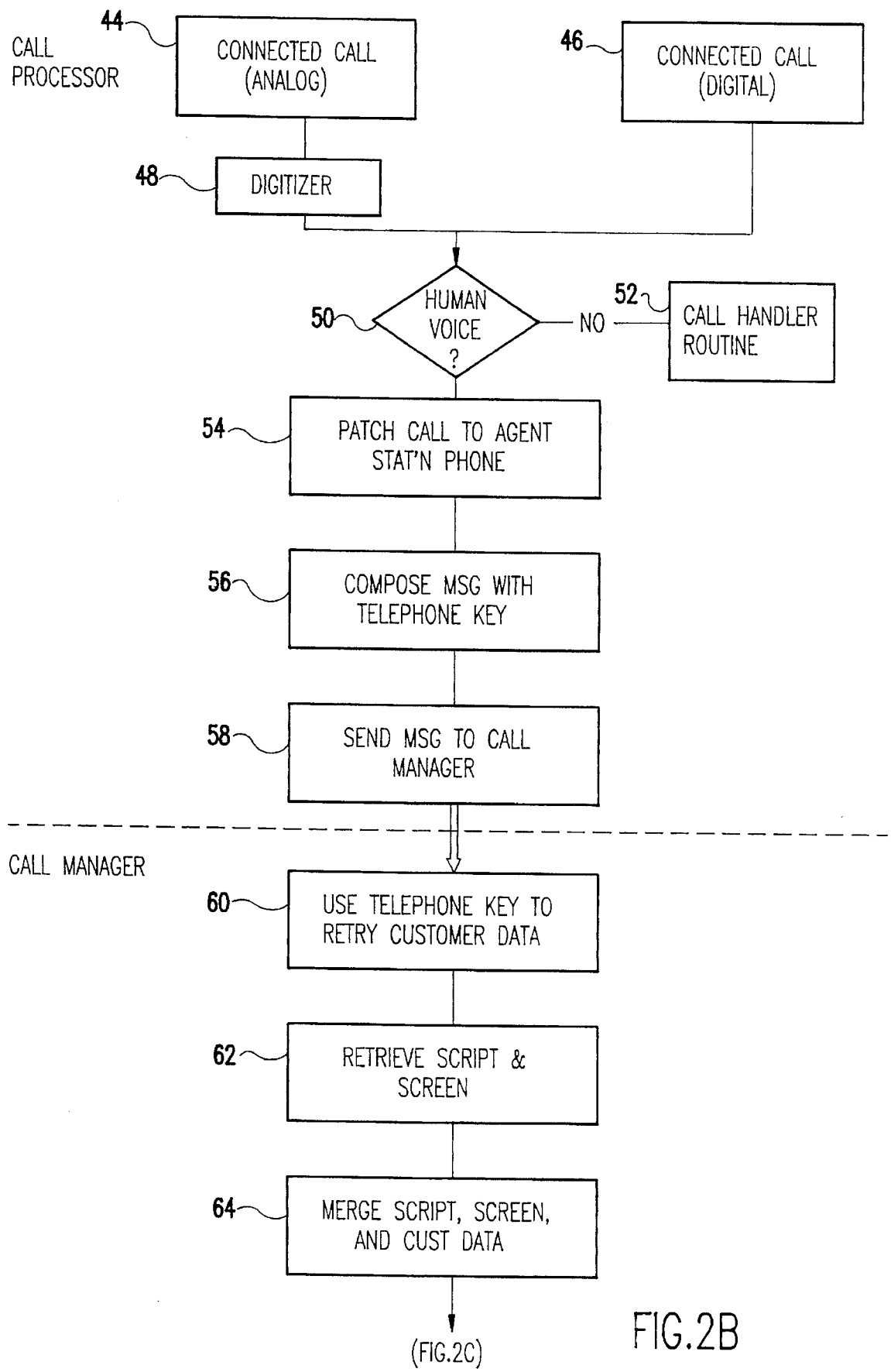

Referring now to FIG. 2B, at steps 44, 46, a human or a telephone answering machine answers one of the calls. If the communication trunk line is analog, at step 48 call processor 11 digitizes the signal using standard techniques. The established connection is detected and tested by a human voice detector of the call processor 11 (step 50).

If the detected signal is not a human voice signal (e.g. an answering machine), a call handling routine 52 performs an appropriate function such as disconnecting the call, outputting a prerecorded message, or connecting an agent to record a message on the machine. If the detected signal is a human voice, the call processor switches this call, in step 54, to a telephone at an agent station. The switching step may be implemented by continuously monitoring the telephone connections at each agent station and establishing an operational queue, which represents the operators awaiting the establishment of the communication with the customers. The computerized representations of the operators can be arranged in the queue in the sequence in which the operators are connected to communicate with the called customers and, at any given time, the operator at the front of the queue is the next operator to be connected for the communication with a customer.

After the connection between the customer and the agent has been established, call processor 11 creates and sends a message notifying call manager 14 that a call has been switched to an agent (steps 56, 58). The message must contain at least the customer identifying Key and the agent station identifier. In a preferred embodiment, this message comprises: (1) "Message Type Code", which in this case, indicates that a telephone connection exists between an agent and a customer; (2) "Campaign ID" that identifies the current calling session; (3) "Customer Key" which identifies the customer; (4) "Agent Station ID", which informs the call manager which agent station is connected to communicate with this customer; and (5) "Trunk ID" which identifies the outgoing line connected to the agent station.

Figure 2C:
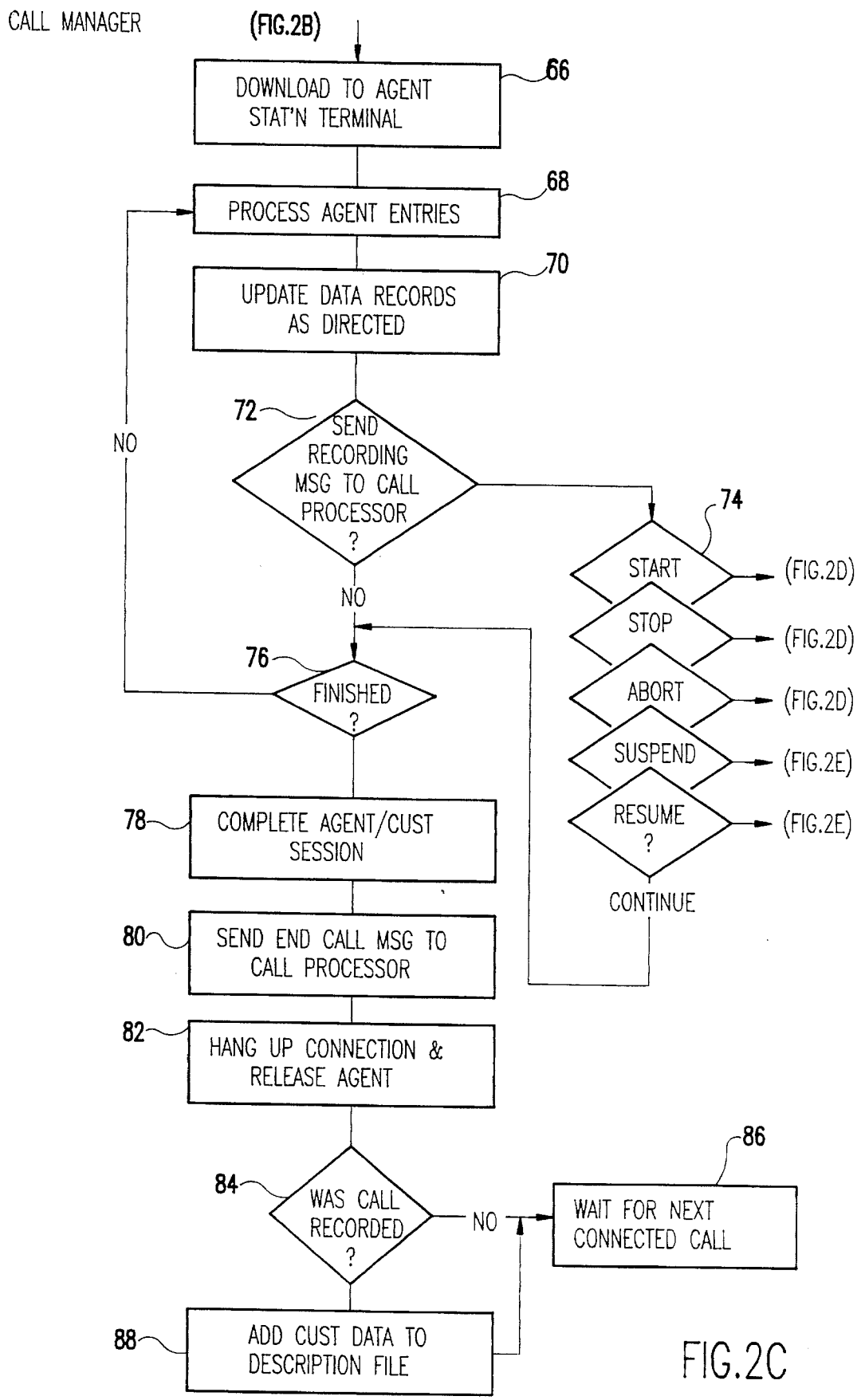

Using the received customer identifying Key, call manager 14 retrieves in step 60 the associated customer information from the description file 175. The retrieved information is merged with a script which is used in the communication with the customers during the calling campaign (steps 62, 64). The merged script and customer information are downloaded in step 66 (FIG. 2C) to the agent station. The agent may now speak to the customer while viewing the downloaded script screen of the terminal. During the conversation, call manager 14 updates the customer data record(s) by entering any customer information which the agent types at the station terminal (steps 68, 70). Call manager 14 continuously monitors the station terminal 15 for a request related to automatic recording of the conversation (step 72). At some point during the conversation, the agent may signal the call manager (e.g. by a terminal keystroke) such a request. This message may be to start, stop, abort, suspend or resume the recording (step 74).

Figure 2D:
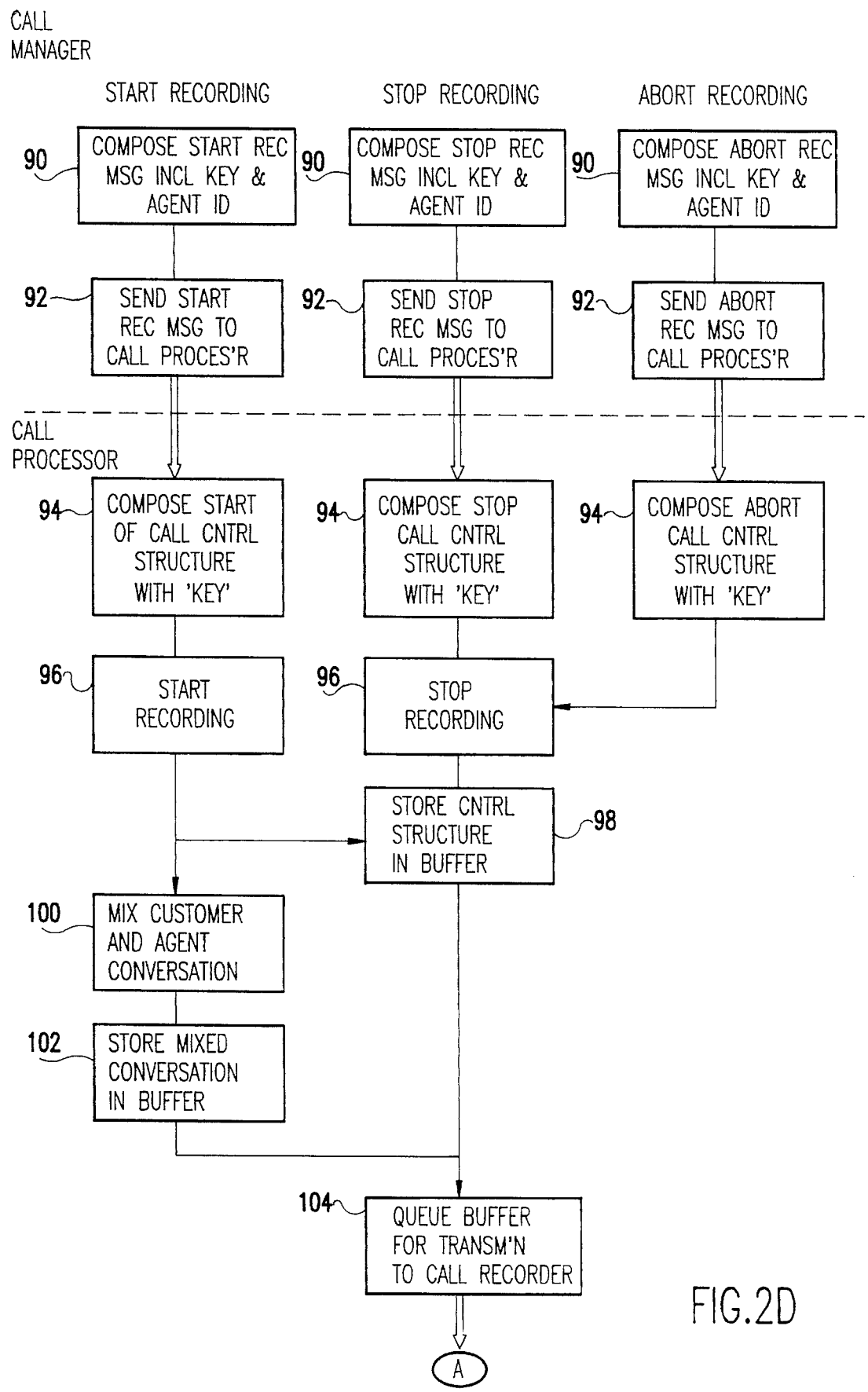

Referring now to FIG. 2D, when the agent signals any such a request, call manager 14 generates and sends in response to call processor 11 (steps 90, 92), an appropriate message which includes the Customer Key and the Agent Station ID. This message may also comprise a "Message Type Code", which identifies the recording request as: "Start", which is a request to begin the recording; "Stop", which is a request to terminate the current recording; "Abort", which indicates that the recording of the specific conversation should be stopped and the recorded voice information purged; "Suspend", which is a request for a temporary interruption of the recording; and "Resume", which is a request to restart a suspended recording.

In step 94 call processor 11 creates an appropriate call control structure which includes the type of request i.e., the "Message Type Code", the "Customer Key" and the "Conversation ID", and executes the request in step 96. The created call control structure is saved in a temporary buffer 190 shown in FIG. 8 (step 98). Call processor 11 next combines for each call the signals from the customer and the agent, divides the customer-agent conversations into conversation segments which are labeled with the unique Customer Key, and mixes them with conversation segments from other customer calls into a data stream (step 100).

Call processor 11 attaches a conversation ID to each of the conversation segments and stores in step 102 this data into buffer 190. Conversation segments belonging to the same agent-customer conversation are assigned the same conversation ID. Conversation segments from another agent station are assigned a different conversation ID. The size of each segment is preferably about 8K. If multiple customer conversations are held simultaneously, the call processor forms a continuous data stream of conversation segments uniquely identified by their IDs. In step 104, the data stream is stored in the temporary buffer for transmission to call recorder 16.

Figure 3:
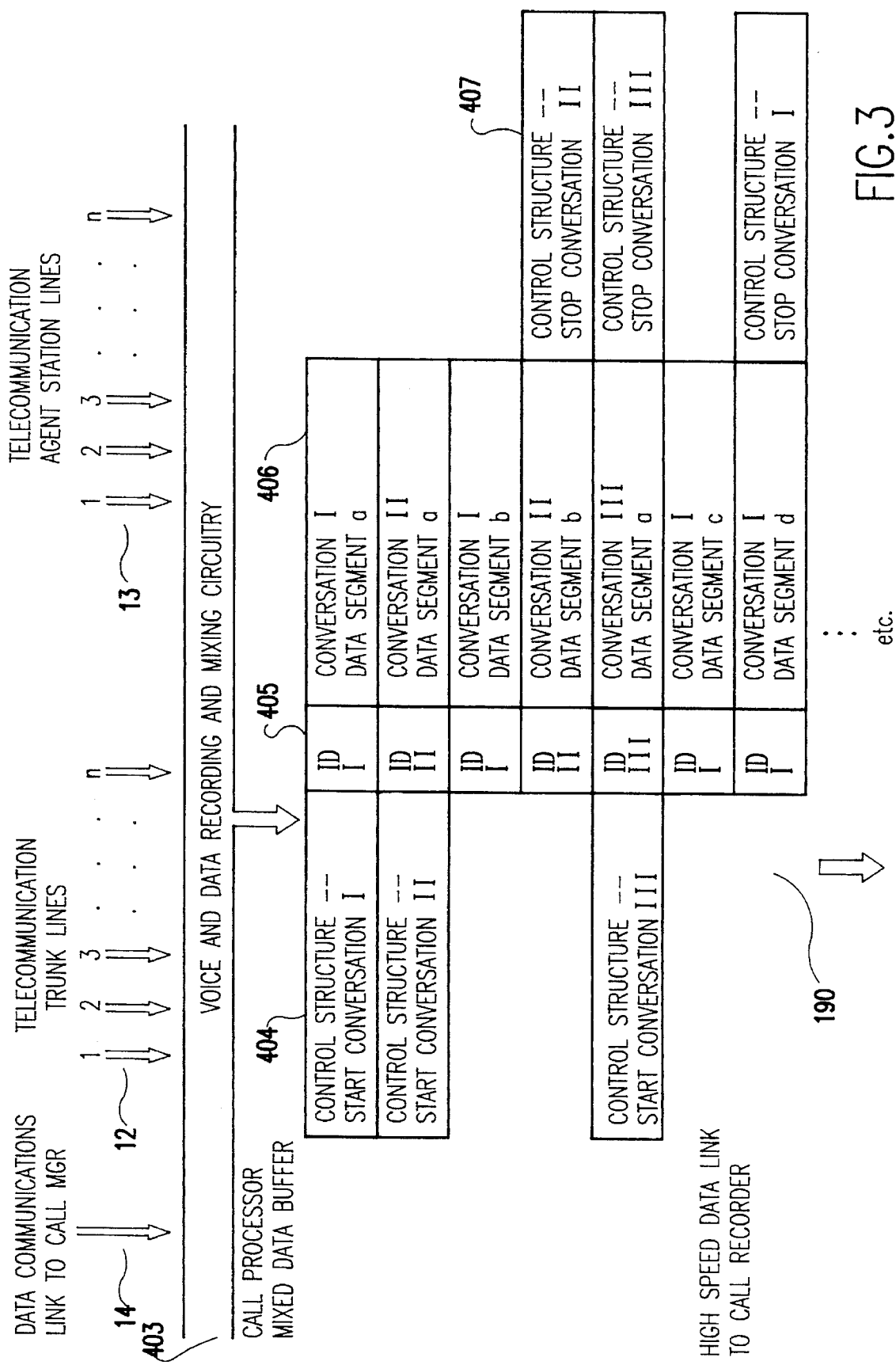
FIG. 3 illustrates the process of recording and mixing data in the storage buffers of the call processor.

The previous discussion is illustrated in FIG. 3 which shows the voice and data recording and mixing circuitry 403 of the call processor that receives input from call manager 14, from the telecommunications trunk lines 12, and from the agent telephones 13. As shown in FIG. 3, the control structures and conversation segments from different customer calls are stored chronologically in the temporary buffer 190 of the call processor 11. The recording for each customer is delimited by the start and stop call structures and may comprise one or more conversation segments.

More specifically, each recorded conversation is identified by a start call control structure 404 and a stop call control structure 407, both provided by the call processor 11. At least one conversation segment 405 is stored for each conversation. An identification 405 is attached to each conversation segment and control structure.

Figure 2E:
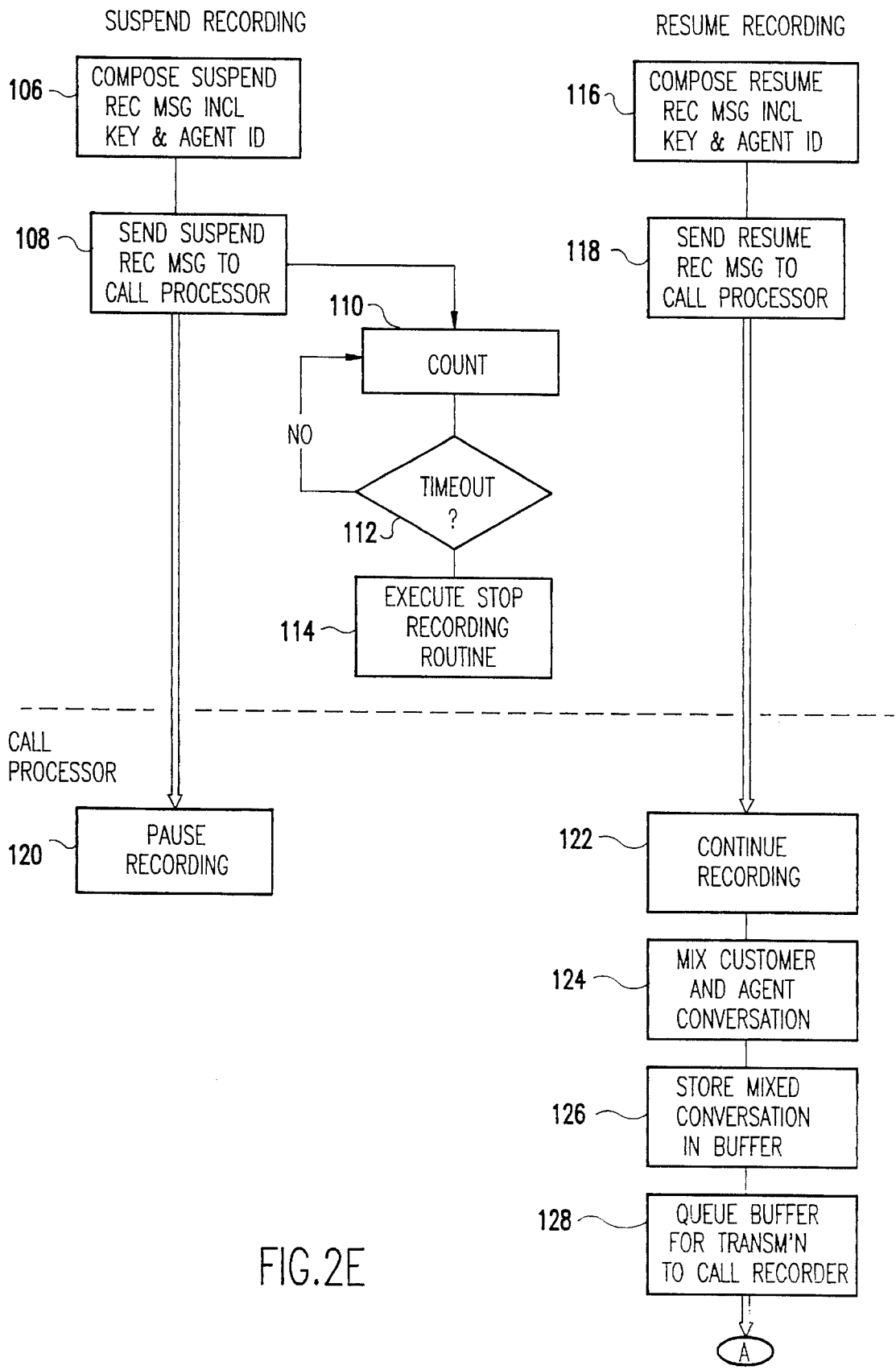

FIG. 2E illustrates the instruction sequence executed when the agent signals to call manager 14 a request to suspend or resume recording of the conversation. In each case, call manager 14 first creates and sends to call processor 11 an appropriate message which contains the customer identifying key and the agent ID (see steps 106, 108 for suspend recording and steps 116, 118 for resume recording). On request to suspend the recording of a conversation, call processor 11 makes a pause in the recording of a given conversation (step 120). If the agent does not request the call manager to resume a suspended recording, following a timeout period which is determined by a counting loop (110, 112) call manager 14 executes a stop recording routine (114).

If the agent signals call manager 14 to resume recording, the appropriate message is sent to the call processor (step 118). In response, call processor 11 continues recording of the conversation (step 122), according to the steps illustrated as instruction sequence 124, 126 and 128 which corresponds to steps 100, 102 and 104 in FIG. 2D.

Figure 2F:
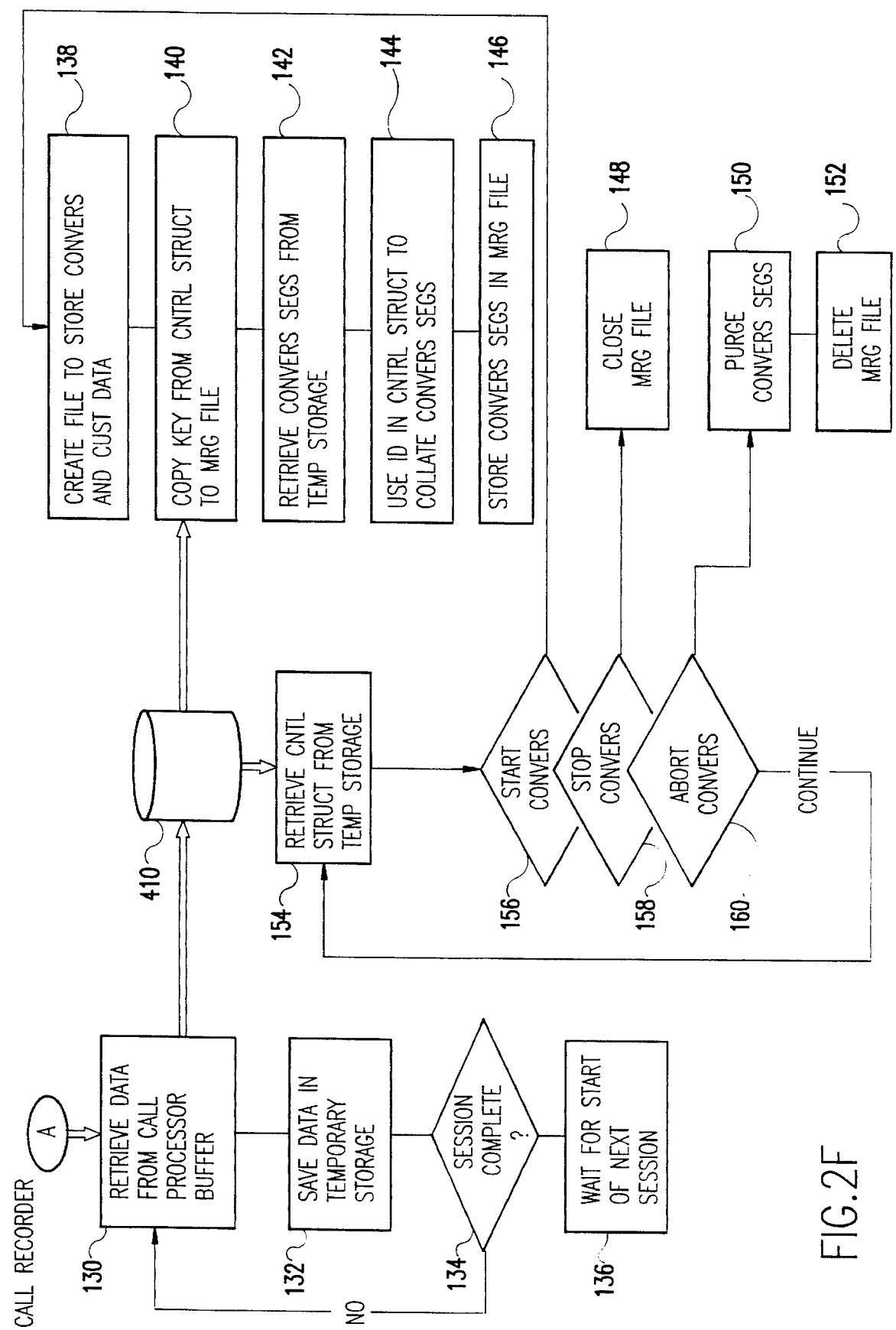

The operation of call recorder 16 is illustrated in FIG. 2F. Specifically, in step 130 call recorder 16 retrieves data from the temporary buffer(s) 190 of call processor 11 over a high speed data link. The retrieved data is stored in temporary storage 410 (step 132). The high speed data link may be a channel connection or local area network, and preferably operates at a throughput rate of approximately 400K bytes per second. Such transmission rate permits the recording and storage of several dozens of simultaneous customer conversations. The data transmission to the temporary storage 410 of data recorder 16 continues until there is no data left in the temporary buffers of call processor 11. (steps 130, 132, 134). Call recorder 16 waits for the start of the next recording (step 136).

The data stream stored in temporary storage 410 is processed to separate different recorded conversations into individual customer voice data records. In step 154 call recorder 16 reads the content of temporary storage 410 until it reaches a control structure. Dependent on the particular retrieved control structure, call recorder 16 starts (step 156), stops (step 158), or aborts (step 160) the process of forming individual customer voice data records. If the retrieved call structure indicates the start of a conversation, call recorder 16 creates a voice data structure for the particular customer, that comprises a data management header and a control record which includes the customer identifying Key copied from call manager 14 (steps 138, 140).

As call recorder 16 continues reading data from temporary storage 410, conversation segments which belong to the same conversation are retrieved (step 142), collated (step 144) and stored in the corresponding customer voice data structure (step 146). To separate conversation segments from different conversations, in step 144, call recorder 16 uses the ID attached to each segment. If the retrieved call control structure indicates the end of a conversation, in step 148, call recorder 16 closes the corresponding voice data structure. If the retrieved call control structure indicates a request to abort the recording of a conversation, in step 160, call recorder 16 purges the corresponding conversation segments and deletes the voice data structure (steps 150, 152).

Figure 4:
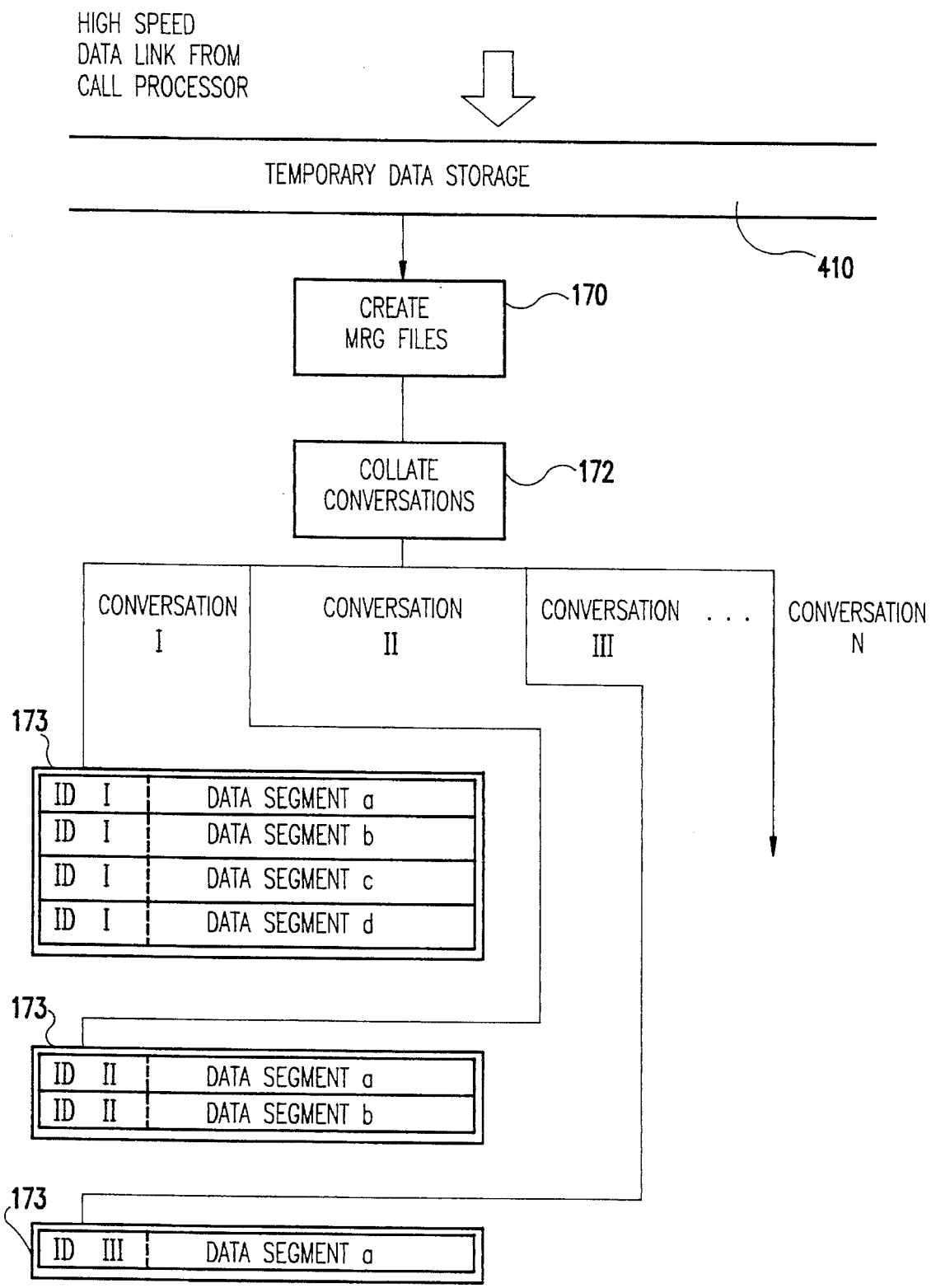
FIG. 4 is an illustration of the process of collating data segments in the call recorder of the present invention.

FIG. 4 illustrates the process of collating conversation segments and separating them into individual voice data structures for different customer-agent conversations. For each start call control structure read from temporary storage 410, call recorder 16 creates a corresponding voice data structure 170. Next, using the unique customer ID, call recorder 16 collates (step 172) conversation segments which belong to the same conversation into the created customer voice data structure 173. As shown, for each conversation, the corresponding voice data structure 173 comprises chronologically stored conversation segments.

An example of the control structure received by call recorder 16 from the call processor 16 is:

```
typedef struct ctlpkthdr {
    LONG Signature;
    LONG Id;
    LONG Command;
    BYTE Key[16];
    BYTE Trunk[4];
    BYTE Station[4];
} CtlPktHdr;
``` where: "Signature" indicates whether the following data is a control structure or a conversation data segment; "Id" is the identification number that the call processor has assigned to the conversation data segment which follows; "Command" indicates the request to start, stop, or abort the conversation; "Trunk" identifies the telecommunications network trunk; and "Station" identifies the corresponding agent station.

Referring back to FIG. 2C after the conversation is completed, in step 78 the agent station signals call manager 14, which in turn sends to call processor 11 an end-call message (step 80). In addition, in step 82, call manager 14 signals call processor 11 to release the network connection to the corresponding agent station. Call manager 14 then waits for the agent to complete entering any remaining customer information (steps 84, 88). The agent station is made available for the next connected call (step 86).

A list of the notations used in FIGS. 2A–F is presented in Appendix A.

Figure 5:
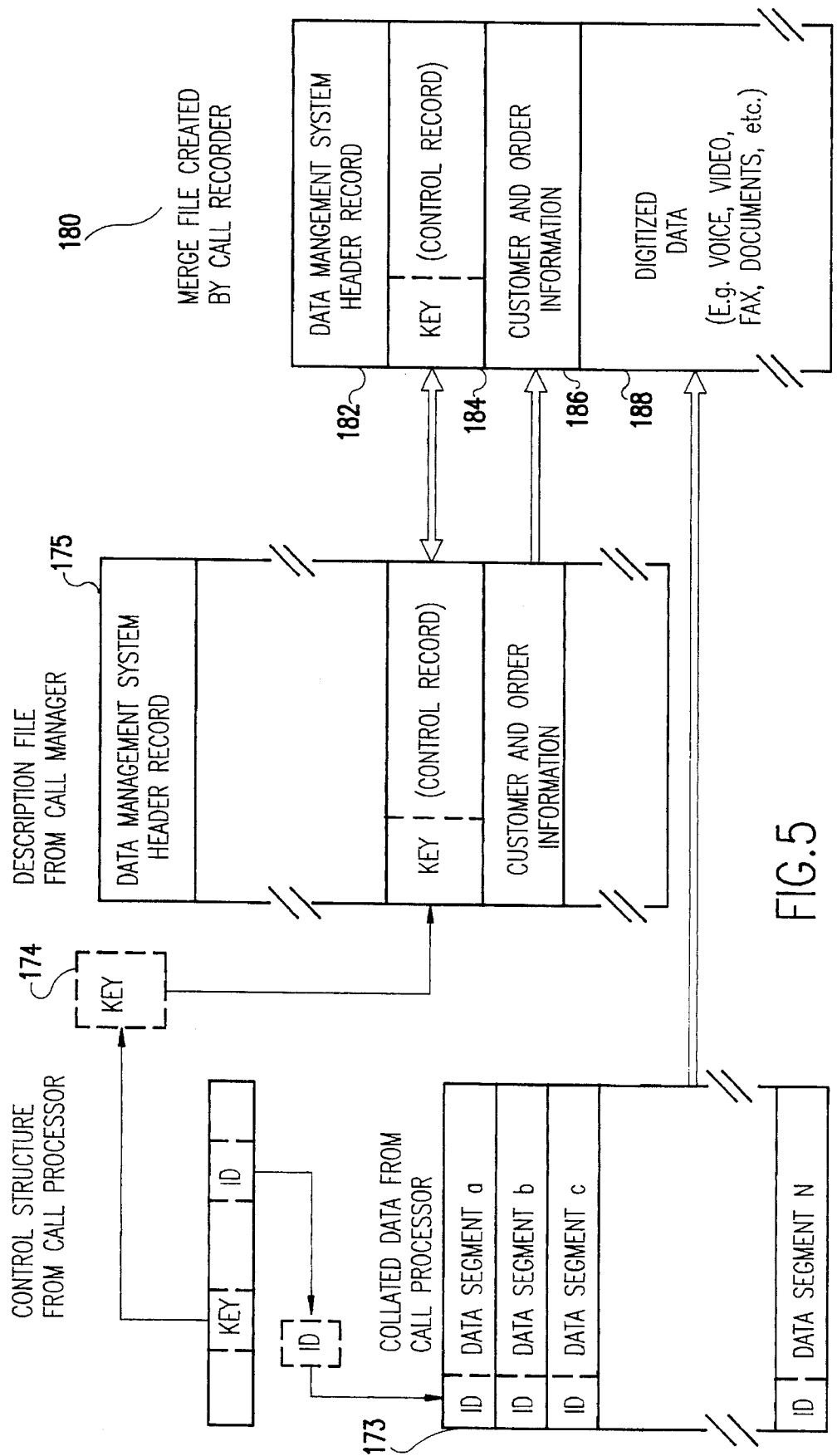
FIG. 5 illustrates the process of forming a merge file in the call recorder using the description file and the collated data segments in FIG. 4.

At the end of the calling campaign, call recorder 16 collates all customer conversations and uses them to create new customer data records (referred to as merge files) as shown in FIG. 5. As illustrated in FIG. 5, call recorder 16 retrieves description file 175 from call manager 14 and searches for a match with the corresponding customer identifying Key 174 in the recorded voice data structures 173. Call recorder 16 then links the matching customer information from description file 175 with the recorded voice data structures 173 in a customer merge file 180. (FIG. 5 illustrates the content of the files 175, 180 and data structure 173).

The complete merge file 180 includes a data management file header 182, a control record portion 184, a customer data portion, such as order information, 186, and digitized voice data portion 188. All four portions of these merge file are keyed to the same transaction. After merge file 180 is closed, it is transferred to the verifier subsystem.

Figure 6:
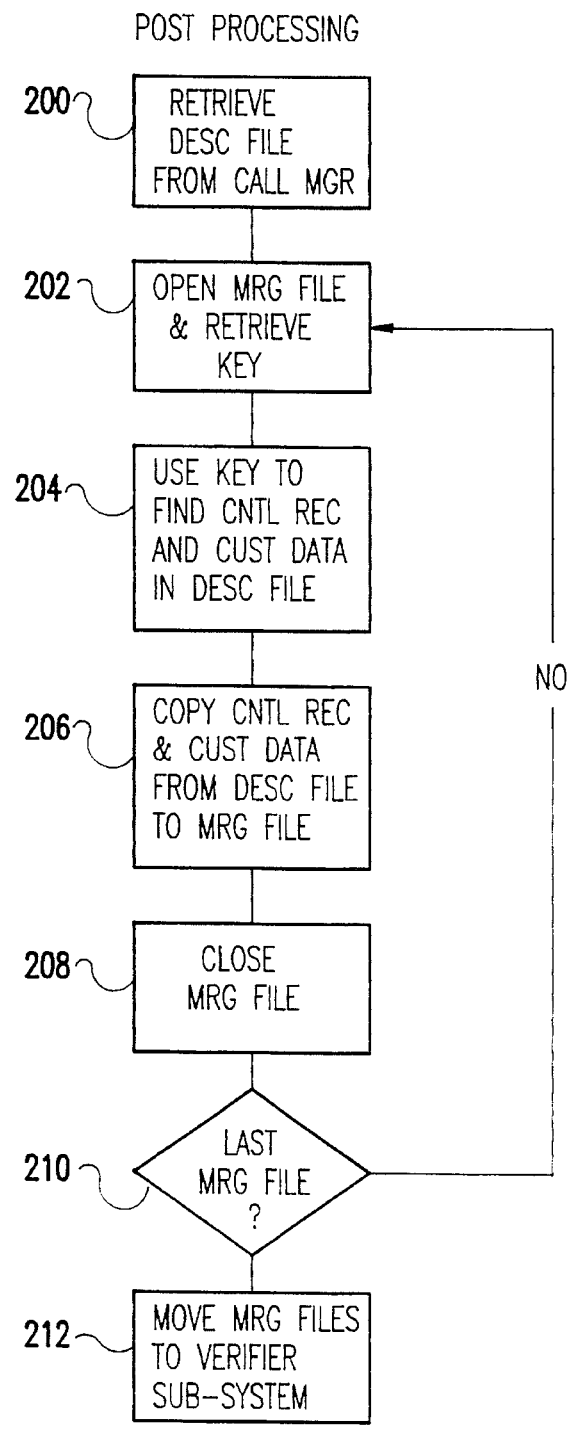
FIG. 6 is a flow chart of the post-processing stage which completes the merge files and prepares them for verification.

The steps of creating and storing merge files 180 corresponding to multiple customer conversations are shown in FIG. 6. After retrieving the description file 175 at step 200, call recorder 16 loops for each customer transaction through steps 202–210 until it completes processing of all the merge files 180 of the calling campaign. As described, for each customer call recorder 16 opens the merge file (step 202) and, using the Key, locates the customer data record and the corresponding voice record and copies both into the merge file (steps 204, 206). Thereafter, the merge file is closed (step 208). After the last merge file of the calling campaign has been processed (step 210), the merge files are transferred to the verifier subsystem 7 from the data store (step 212).

Figure 7:
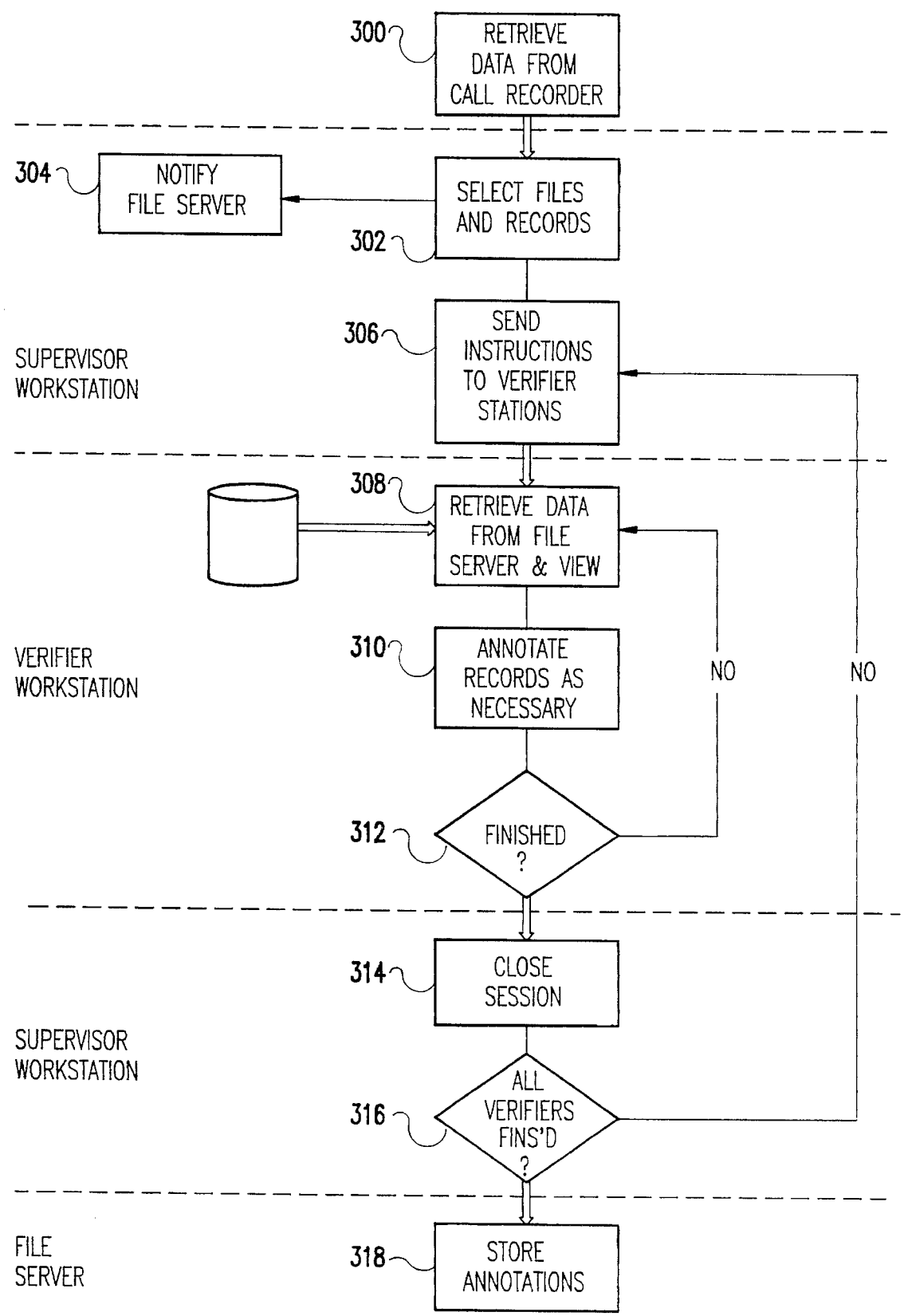
FIG. 7 is a flowchart of the information flow in the verification subsystem.

FIG. 7 illustrates the information flow of the verifier subsystem 7 of the calling system of the present invention. The verifying subsystem, in step 300, retrieves data from call recorder 16. This data may be communicated to file server 24 via communication link 25, or alternatively be stored in a tape which is physically transferred to mass storage 21 where the data can be read. Supervisor station 22 then selects, in step 302, files and records and sends instructions to verifier stations 26.

Each verifier station 26 then retrieves data from file server 24 (step 308), identifies and separates the customer data portion 186 and the voice data portion 188 of the merge file. The voice data portion, which is stored in a digital format is transmitted to a digital-to-analog converter and played back to the operator who may compare the voice recording to the customer data portion displayed at the verification station terminal. After comparing the records, the operator may enter comments (step 310), reconcile the records in accordance with the voice recording of the customer conversation, or proceed otherwise following the supervisor instructions. After all verifying stations finish their work, supervisor station 22 closes the verifying session and stores all annotations in file server 24 (steps 314, 316, 318).

Figure 8:
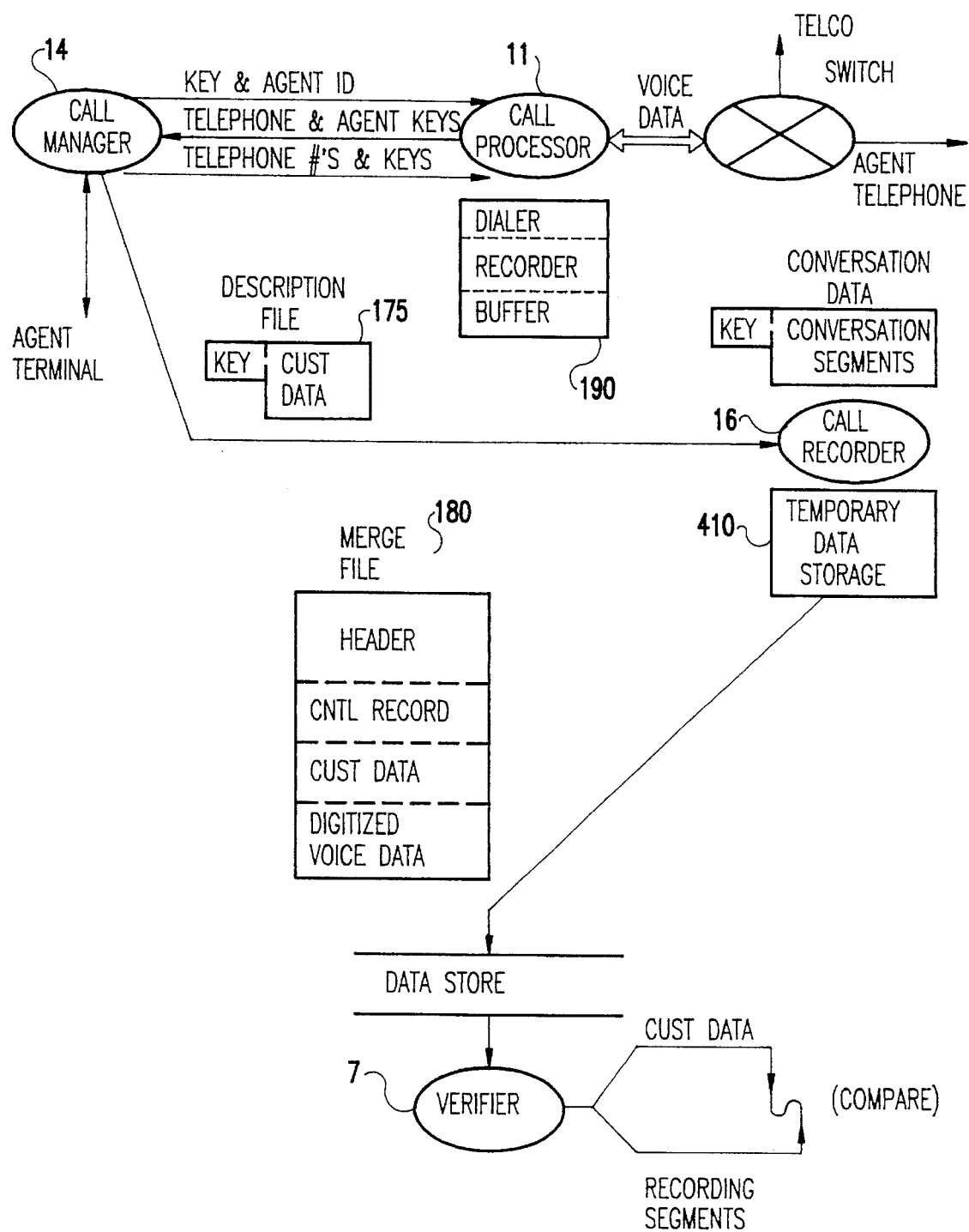
FIG. 8 summarizes the interconnections and operation of the system of the present invention.

FIG. 8 summarizes the logical interconnections of the individual processes of the calling system of the present invention that have been described above. FIG. 8 also illustrates the directions of information flow between the call processor 11, call manager 14, call recorder 16, and the agent stations 6 of the call recording subsystem 5 and the verification subsystem 7, and identifies the location and content of the data records used by the system.

It should be emphasized the system of the present invention is designed for processing of multiple simultaneous customer transactions. Specifically, call processor 11 may monitor and record calls on multiple telephone lines simultaneously. In addition, both call manager 14 and call processor 11 may communicate with multiple agent stations. Call recorder 16 is similarly capable of receiving, separating, and collating interleaved recording segments from a data stream of multiple simultaneous conversations. Finally, the verification process may be distributed among several operators.

In a preferred embodiment of the invention, call processor 11, call manager 14 and call recorder 16 are processes running on separate personal computers, as illustrated in FIG. 1. The verification subsystem 7 in a preferred embodiment of the present invention comprises a computer file server and workstations interconnected by a local area network. A specific advantage of this configuration is the relatively low cost of implementation.

In another preferred embodiment of the present invention, the calling system can be implemented on any computer capable of multiprocessing, or multitasking where the individual processes can be synchronized and can exchange messages while running. Examples include general purpose "time-slice" minicomputers and mainframes, symmetrical multiprocessor computers, and multiprocessor and single-processor transaction processing computers.

The calling system of the present invention may also be implemented using several architectures which differ in the interconnections between the process components and the exchange of information between them. Specifically, the call manager may be connected, either directly or through a data communications gateway, to a host computer, which in turn may connect directly to agent terminals. In this embodiment the data terminals of the agent stations may be connected to both the host and the call manager, so that an operator may have access to processes running at the host, while still being part of the calling campaign.

It should be noted that the system of the present invention is also capable of processing different types of unformatted analog and digital data including the transmission of audio, video and document data between the customer and the agent stations. Specifically, a part of the customer communication may include the exchange of video, FAX or image documents, or other type of data, as required.

To this end, call processor 11 of the system may further include a detector for recognizing the type of communication in accordance with a communications protocol from the communication network lines. If a portion of this data is to be stored as part of the customer record, call processor 11 can generate and provide to the call recorder 16 a unique data type identification structure which can be used to separate the different data types for subsequent display or reproduction.

It is to be expressly understood that the present invention is not limited to the description of the preferred embodiments but encompasses other modifications and alterations within the spirit of the inventive concept which scope is defined by the following claims.

APPENDIX A

Notations used in FIGS. 2A–F:

Session
The period during which the call recorder retrieves data from the call processor buffer.
Cntl Struct
Control Structure. Data from the call processor which contains keys, identifiers, and instructions for the call recorder.
Temp Storage
Temporary Storage. A block of computer memory, disk, and/or tape where the call recorder places data retrieved from the call processor.
Mrg File Merge File. The data management file created by the call recorder.

Cust Data

Customer Data. Customer information which the Call Manager consolidates. It enables the verifier to reconcile the recorded conversation with the on-line data.

Key

A unique identifier which allows the call recorder to link digitized conversations retrieved from the call processor with customer data it retrieves from the call manager.

ID

An identifier which allows the call recorder to consolidate and collate conversation segments.

Convers Segs

Conversation Segments. As the call processor mixes and records a conversation, it may store the data in a buffer in discrete blocks rather than continuously. Each block is called a Conversation Segment. This has the advantage of allowing the Call Processor to handle multiple simultaneous calls and interleave blocks from different conversations in its buffer. The Conversation Segments are each 8K bytes long.

Desc File

Description File. As the call manager notifies the call processor to begin recording a call, it extracts relevant customer information from its data management files, attaches a Key, and stores the data. At the end of a session, the Description File contains customer information on all of the recorded conversations.

What is claimed is:

1. An automated calling system which stores a digital voice record of at least a portion of a conversation between an agent and a customer from which digital voice record an audible version of said conversation can be recreated for verification of a data input by the agent to a customer record in response to the conversation, comprising in combination:

an agent telephone set, and an agent station including an agent data input means, and an agent data display means;

call processor means;

call manager means;

a first data link establishing a two way data communications link between said call manager means and said agent data input means and said agent data display means;

a second data link establishing two way data communications between said call processor means and said call manager means;

said call processor means connecting a telephone trunk to said agent telephone set to establish a two way voice communication link between the customer and the agent telephone set;

means to store customer records;

said call manager means transmitting over said first data link customer record data to said agent data display means from said means to store customer records and storing, in said means to store customer records, changes to said customer data inputted from said agent data input means;

a digital voice recorder means;

a voice communications link between said call processor means and said digital voice recorder means;

said call manager means transmitting over said second data link a begin recording command, to said call processor means in response to an input to begin recording from said agent station to said call manager means over said first data link;

said call processor means transmitting said at least a portion of said conversation between the agent and the customer over said voice communications link to said digital voice recorder means;

said call manager means transmitting a customer identifier and an agent identifier to said digital voice recorder means; and said digital voice recorder means recording said digital voice record of said at least a portion of said conversation, along with said customer identifier and said agent identifier.

* * * * *